Figure 1:
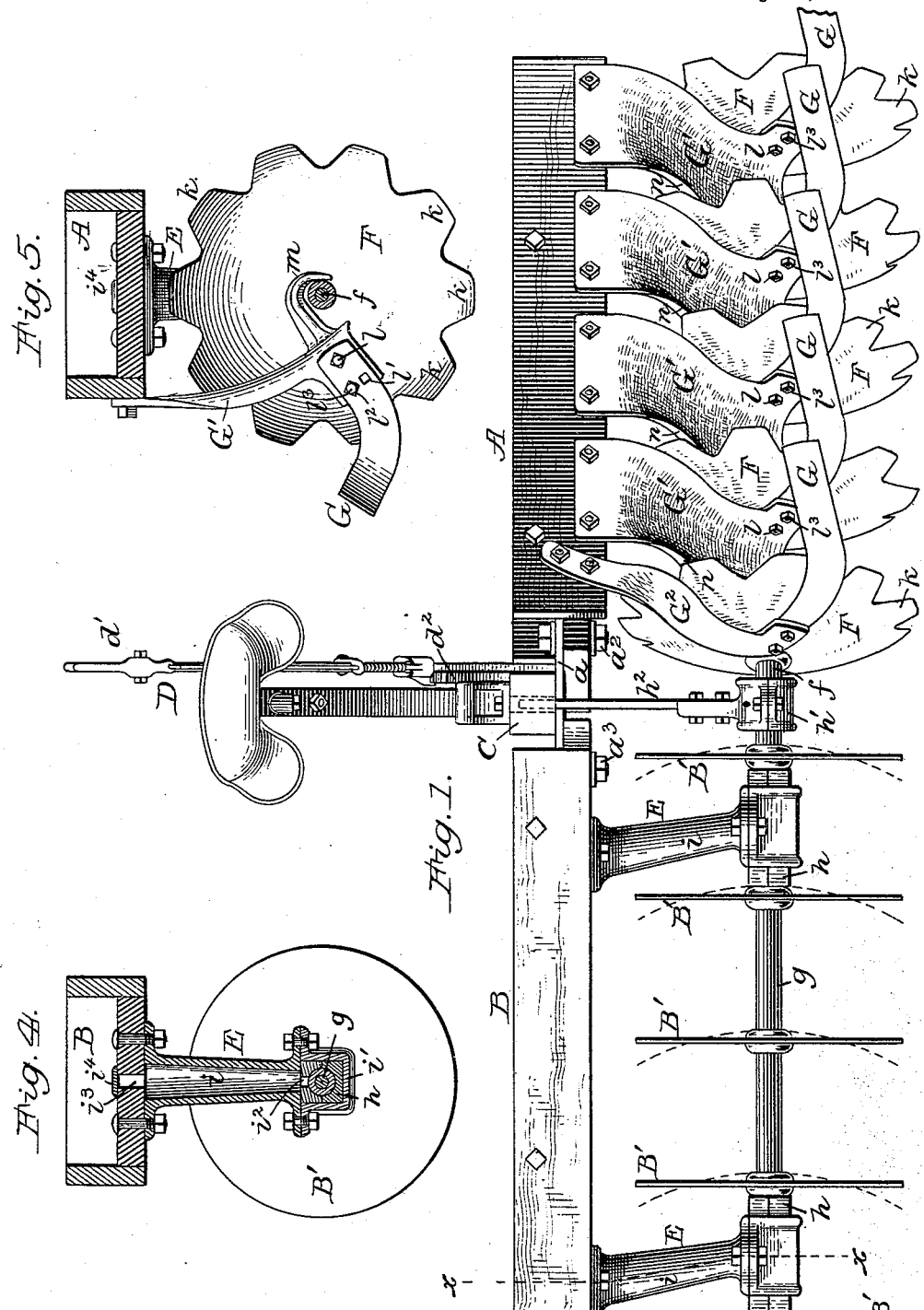

(No Model.) 3 Sheets—Sheet 1.

G. M. CLARK.
LAND PLOWING MACHINE.

No. 478,500. Patented July 5, 1892.

(No Model.) 3 Sheets—Sheet 2.

G. M. CLARK.
LAND PLOWING MACHINE.

No. 478,500. Patented July 5, 1892.

Attest:
Philip F. Larner
Howell Bartle

Inventor:
George Marshall Clark
By
attorney

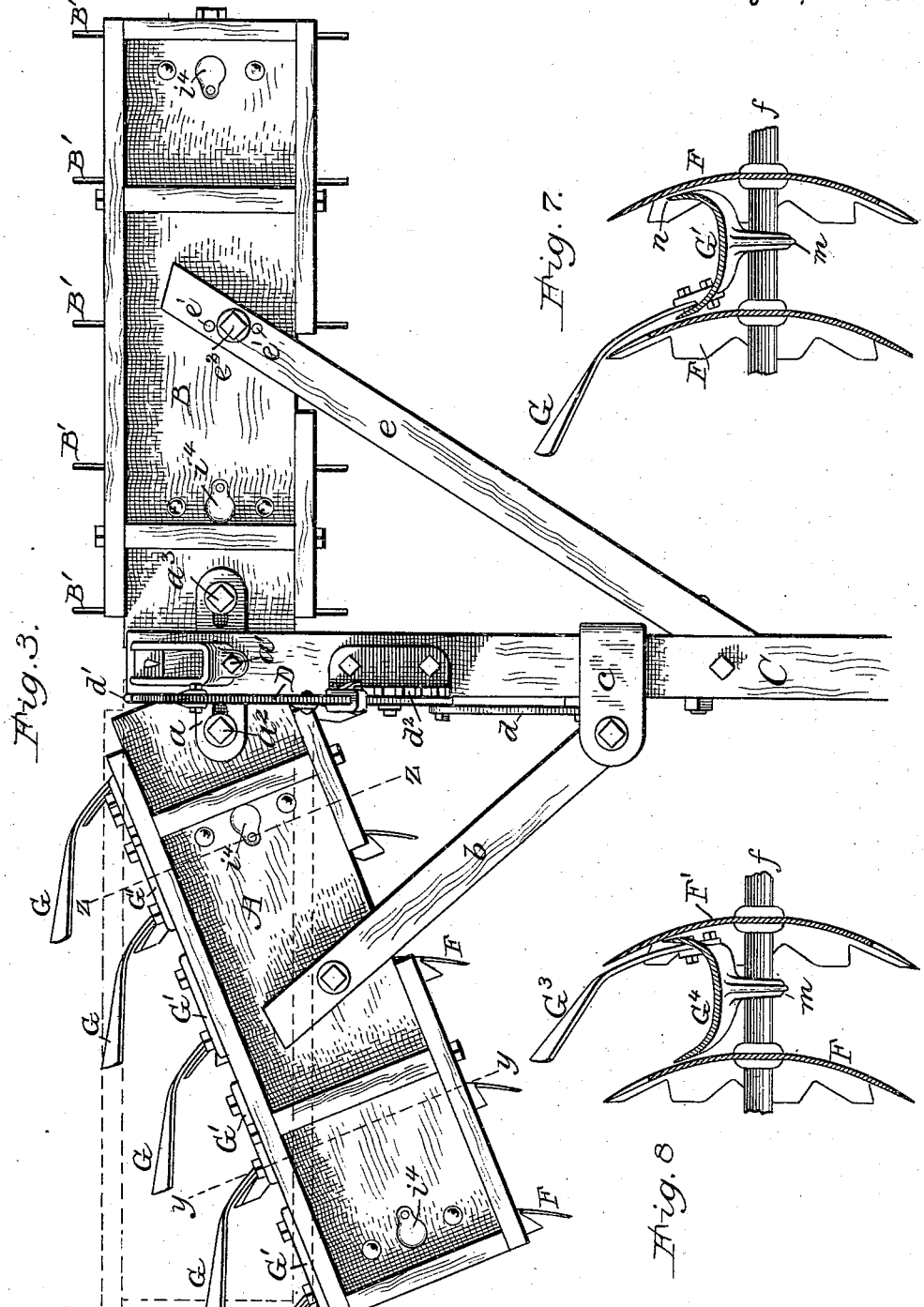

United States Patent Office.

GEORGE MARSHALL CLARK, OF HADDAM, CONNECTICUT, ASSIGNOR TO CLEMENT S. HUBBARD, OF SAME PLACE.

LAND-PLOWING MACHINE.

SPECIFICATION forming part of Letters Patent No. 478,500, dated July 5, 1892.

Application filed December 9, 1891. Serial No. 414,487. (No model.)

*To all whom it may concern:*

Be it known that I, GEORGE MARSHALL CLARK, of Haddam, county of Middlesex, and State of Connecticut, have invented certain new and useful Improvements in Land-Plowing Machines; and I do hereby declare that the following specification, taken in connection with the drawings furnished and forming a part of the same, is a clear, true, and complete description of my invention.

My said improvements pertain generally to machines embodying rotary plowshares, and particularly to that class of machines heretofore devised by me and in which the rotary shares are concavo-convex bladed disks co-operating with mold-boards and also with colters which perform landside duty, as disclosed in my application for Letters Patent filed January 14, 1891, Serial No. 377,701.

The objects of my present invention, broadly stated, are to provide comparatively light machines which can be relied upon for effective plowing service with teams of moderate power and which can be operated with convenience and readily adapted to different requirements, according to the varied conditions and character of soil to be plowed.

A machine embodying the main feature of my present invention has a gang of rotary plowshares and their mold-boards at one side of but inclined to the line of draft and a gang of rotary disks operating as landsides at the other side of the line of draft, so that the plowing operation is always performed at one side of the draft-line and the landside duty restricted to the other side of said line, this latter operation involving either simple straight-line cuts in the sod or soil, or, when desired, the disks while performing the landside duty may also do more or less earth-working duty and enable the plowshares to subsequently cut into the soil more deeply and to plow with increased efficiency.

My machines also embody various minor improvements, and after describing the machine illustrated in the drawings and its modes of operation the features deemed novel will be duly specified in the several clauses of claim hereunto annexed.

Figure 2:
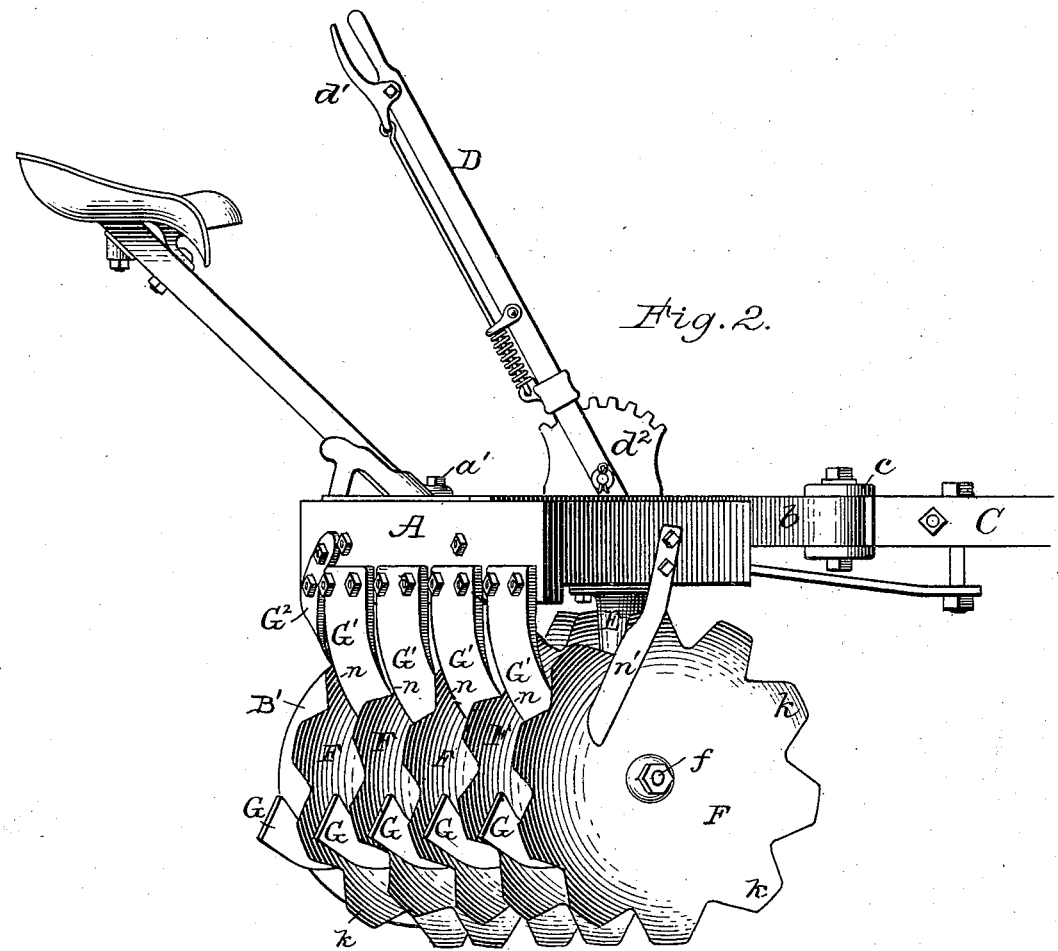
Figure 6:
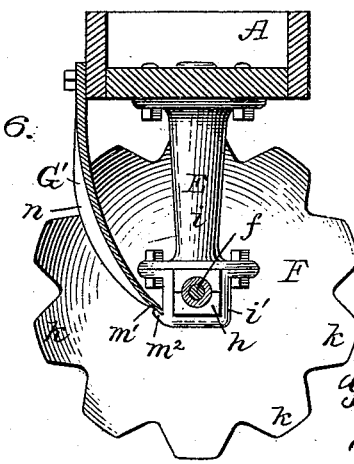

Referring to the drawings, Figure 1 illustrates one of my machines in rear elevation adjusted for service. Fig. 2 illustrates the machine in side view. Fig. 3 illustrates the machine in top or plan view. Fig. 4 is a cross-section of the machine on line $x$, Fig. 1. Fig. 5 is a lateral section of the gang-plow, axle, and frame on line $y$, Fig. 3. Fig. 6 is a lateral section of the gang-plow, axle, and frame on line $z$, Fig. 3. Fig. 7 is a horizontal sectional view of two plowshares and an intervening mold-board hanger. Fig. 8 in horizontal section illustrates a pair of rotary plowshares with a mold-board combined therewith in a manner unlike that shown in Fig. 1, but which may be used in my machines without departure from certain features of my invention.

The frames of my machines may be quite widely varied in matters of detail so long as the plow-gang frame A and the landside-gang frame B are connected together at their ends and to a central draft-pole C. The plow-gang frame A to be operative must be angular to the pole or, in other words, to the line of draft, and for convenience in trundling the machine from place to place said plow-gang frame A is flexibly and adjustably connected with the pole, as by coupling-plate $a$, clamping-bolt $a'$, pivot-bolt $a^2$, a draft bar or link $b$, and a yoke $c$, adapted to slide on the pole and connected by a link $d$ with the foot of a hand-lever D, provided with the usual hand-latch $d'$ for engagement with a segmental notched plate $d^2$ in a manner well known. This adjustability of the gang-plow frame also enables the plowshares to be promptly so set that they may readily override certain kinds of obstructions, as well as to vary the operation of the shares.

The landside-gang frame B may be variably set and secured to the pole, according to the form and character of the disks B', relied upon for landside-duty—as, for instance, if the disks be plain and flat the landside-gang frame should stand at right angles to the line of draft, as shown, said frame being connected at its inner end to the pole by the pivot-bolt $a^3$ and coupling-plate $a$ and further connected to the pole by a draft bar or link $e$, bolted to the central portion of the frame. Should the landside-disks be concavo-convex, the frame B would be angularly adjusted with reference to the line of draft, the bar or link e at its rear end being provided with one or more holes, as at e', either one of which may be occupied by the bolt $e^2$, which connects the link to the frame.

The plow-gang axle f and the landside-gang axle g have their bearings in closed wooden boxes h in inclined hangers E, bolted to the under sides of their respective frames, and at their inner ends these two axles are flexibly united by means of a ball-and-socket connection, the socket h' having stem $h^2$, the upper end of which freely occupies a hole in the overlying portion of the butt of the pole, so as to secure the socket against rotation. These hangers or standards E and the boxes h are specially constructed and organized with the frames to which they are respectively connected, so as to practically obviate the entrance of foreign matter to the bearings and at the same time provide for complete lubrication. To those ends the body i of the hanger is a tubular casting, as shown in Fig. 4, having at both ends flanges or ears perforated for the reception of bolts, the flange at the foot having bolted to it a box-strap i', between which and the flange the two halves of the tightly-closed wooden journal-box h are clamped.

The upper half of the wooden box is centrally provided with a large oiling-aperture at $i^2$, which communicates with the tubular interior of the hanger, and the overlying wooden portion of the gang-frame is provided with a hole $i^3$, through which oil may be delivered to the journal-bearing, said hole $i^3$ being guarded by a plug or by a swinging cover $i^4$, as shown. The interior of each standard can be relied upon as a chamber for receiving a semi-solid lubricant in quantity sufficient to serve for an entire season.

The gang-frames are provided with wooden rims, thus affording weight-boxes having partitions, which, with suitable cross-bolts, serve as cross-braces for the frames.

The rotary plowshares F may be varied in their character so long as they are capable of cutting deeply into the soil and lifting displaced portions thereof edgewise to such a height that it may be thoroughly turned over by the mold-boards G. In their best form the shares F are bladed concavo-convex disks, as shown, and have well-sharpened edges and are similar to the soil-working disks disclosed in my Letters Patent No. 369,163. The blades k here shown enable the shares to penetrate deeply into the soil, and the spaces between the blades are of such small area that they do not prevent the share from lifting the displaced masses of soil edgewise into positions favorable to their being turned completely over by the mold-boards.

The mold-boards G are each located at the rear of the plowshares, and they project laterally beyond the rear edge of the share, as in my prior machines; but I have now devised novel hangers G', which are so shaped and arranged that each also serves as a scraper for the concave side of the next adjacent plowshare, as well as affording specially strong and reliable supports for the mold-boards. The mold-boards G are preferably composed of strong flexible steel plate, and they are so shaped and arranged that their front or working surfaces promptly assume control of the lifted soil after it has been left by the forwardly-rolling plowshare. The inner end or shank of each mold-board is provided with three bolt-holes, one of which is round for receiving a bolt l, which passes through the hanger and serves as a pivotal clamping-bolt. The other two holes are square, and are located one above the other near the end of the shank, as at l' $l^2$, so that, as shown in Fig. 5, a square-neck bolt $l^3$ may occupy either of said square holes and a hole in the hanger, thereby enabling the mold-board to be securely mounted in either of two positions of adjustment, high or low, according to the character of soil to be worked and the depth of cut to be made by the plowshare. These hangers G' have edges which conform to the convex and the concave surfaces of the plowshares, and they are bolted at their upper ends to the rear side or edge of the gang-frame A and are securely braced at their lower ends against the strains borne by the mold-boards. Some of the hangers at their lower ends have an integral hook-brace m, which, as shown in Fig. 5, rests upon and engages with the front side of the gang-axle; but between those shares where the journal-boxes are located the hanger is provided with a V-shaped finger-brace m', which rests upon an inclined lug $m^2$ on the front side of the journal-box, as shown in Fig. 6, said lug affording in substance a V-shaped socket for the finger m', thus securely confining the foot of the hanger. The edge of each hanger G', opposite to the edge at which the mold-board is carried, is curved rearwardly (outwardly) and also laterally, and it so far conforms with the concave or working face of a share and is in such close proximity thereto that said edge at n serves effectively as a scraper for keeping the plowshare free from adhesive soil.

The mold-board of the plowshare at the inner end of the gang is provided with a hanger $G^2$, which may have a brace at its foot; but it is shown without one, its upper end being elongated and heavily bolted, and the plowshare at the outer end of the gang has a pendent scraper n' bolted to the frame.

In the use of a machine, as shown, having five of the bladed plowshares, each being, say, twenty (and sometimes twenty-four) inches in diameter and being about eight and one-half inches apart, five furrows can be made, each deeper than and as well turned as the single furrows made with any of the best forms of ordinary plow-nosed shares, and a team in performing this duty with my machine will be under but little, if any, more working strain than when making a single furrow with an ordinary plow.

By having all of the rotary plowshares located at one side of the pole or draftline and the landsides all at the other side of said line the machine is easily turned at corners, and it can be continuously operated, either by working on interior lines around a field or, if desired, on exterior lines, commencing at the center of a field. With this arrangement of the plowshares they can be promptly released from their angular or working position, as in the event of encountering such obstructions as could only be avoided by causing the plowshares to override them, and so, also, if at any time the landside resistance should not be enough to offset the plowshares the latter can be readily adjusted to the contingency by varying the inclination of the gang of plows. While the prime duty of the landside-disks is to resist the lateral thrusting action of the plowshares their colter or cutting action in the soil is conducive to the soil-working action of the plowshares when covering the ground previously traversed by the landsides, and while the main portion of my invention includes as an essential feature a gang of rotary plowshares and mold-boards located at one side of the draft-line and angular thereto and at the other side of the line a gang of rotary landsides it is to be understood that said landsides may be largely varied in their form, arrangement, and mode of operation without departure from the main feature of my invention.

As shown in the drawings, the landside-disks B' are plain or flat sharp-edged disks, and hence they operate as colters as well as landsides. I prefer that these disks should be from two to three inches less in diameter than the plowshares, and as a rule each share should be balanced by a landside-disk. If, however, the machines be intended for use upon specially-soft soils, the landside-disks may be lesser in number and as large as or larger in diameter than the plowshares, and although I prefer that said disks should have continuous edges they may be bladed and yet perform fair but reduced resisting or landside duty, and hence a greater number of bladed disks would be needed for a given number of plowshares than if the edges of the landside-disks were continuous.

The landside-gang frame is usually set at right angles to the line of draft when the flat disks are employed; but, as shown, the landside-gang frame may be angularly adjusted, as by the bolt $e^2$ and holes $e'$ in the draft-link $e$, and such adjustment would be essential if concavo-convex disks, as indicated in dotted lines, were used, and in the latter case certain preliminary soil-working would be performed by the disks while doing landside duty, and this would be specially desirable in operating upon hard sun-baked clay soils. As to the gang of rotary shares, it is to be understood, as hereinbefore indicated, that they may be varied in their character without departure from certain portions of my invention, so long as they have co-operating stationary mold-boards to enable them to perform actual furrow-turning duty, as distinguished from mere soil-working as with ordinary disk harrows.

The arrangement of the mold-boards with relation to the rotary shares, so that they project from the convex sides of the shares rearwardly and laterally, is in accordance with my invention, as disclosed in my aforesaid prior application, and it is with that arrangement that the best results may be secured under all of the varied conditions incident to plowing; but in some soils free from trash fairly-good results may be secured by the use of mold-boards projecting from the concave sides of the shares, and the use of such mold-boards with rotary shares will be within my present invention when said shares are in a gang, and are located wholly at the one side of the line of draft and have co-operating disks located at the other side of said line for performing landside duty.

In Fig. 8 I illustrate a mold-board $G^3$, located at the concave side of a plowshare F', the hanger $G^4$ being mounted, as before described, between the plowshares and with the edges of the hanger conforming, respectively, to the convex side of one share and the concave side of the adjacent share. With the hanger braced at its foot, either by way of a journal-box or by the gang-axle, the balling of trash is prevented not only between the shares, but also prevented from wedging between the mold-board and the concave side of the plowshare.

Having thus described my invention, I claim as new and desire to secure by Letters Patent—

1. In a plowing-machine, the combination, substantially as hereinbefore described, of a gang of rotary plowshares, each having a stationary mold-board and the whole arranged angular to the pole or line of draft, and a gang of landside-disks at the other side of the pole or line of draft for resisting the lateral thrust of the plowshares and mold-boards.

2. In a plowing-machine, the combination, substantially as hereinbefore described, of a gang of rotary plowshares and stationary mold-boards, all angularly adjustable with relation to the pole or line of draft and located wholly at one side thereof, and a gang of landside-disks at the other side of the pole or line of draft.

3. In a plowing-machine, the combination, substantially as hereinbefore described, of a gang of rotary plowshares angular to the pole or line of draft and at one side of said line, and a gang of landside-disks at the opposite side of said line and at right angles thereto.

4. In a plowing-machine, the combination, substantially as hereinbefore described, of a gang of rotary plowshares, each having a stationary mold-board, said gang being at one side of the line of draft, and a gang of landside-disks at the other side of said line, both of said gangs being angularly adjustable to said line of draft.

5. The combination, with a gang of rotary plowshares and mold-boards, of pendent hangers between each two shares, each hanger serving as a support for a mold-board and having one edge conforming to the concave side of one share and the other edge conforming to the convex side of the adjacent share, substantially as described.

6. The combination, with the gang-frames and gang-axles, of closed journal-boxes coupled to the gang-frames by tubular hangers or standards, which are internally accessible by way of holes in the gang-frames for the introduction of lubricants to the closed boxes, substantially as described.

GEORGE MARSHALL CLARK.

Witnesses:
ROBERT S. CRUTTENDEN,
WELLINGTON H. WART.